United States Patent
Liu et al.

(10) Patent No.: US 11,592,581 B2
(45) Date of Patent: Feb. 28, 2023

(54) DUAL INERTIAL MEASUREMENT UNITS FOR INERTIAL NAVIGATION SYSTEM

(71) Applicants: Baidu USA LLC, Sunnyvale, CA (US); Baidu.com Times Technology (Beijing) Co., Ltd., Beijing (CN)

(72) Inventors: Quanwei Liu, Cupertino, CA (US); Zhuo Yao, Beijing (CN); Yan Cui, Palo Alto, CA (US)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 293 days.

(21) Appl. No.: 16/769,372

(22) PCT Filed: Apr. 30, 2020

(86) PCT No.: PCT/CN2020/088368
§ 371 (c)(1),
(2) Date: Jun. 3, 2020

(87) PCT Pub. No.: WO2021/217604
PCT Pub. Date: Nov. 4, 2021

(65) Prior Publication Data
US 2021/0341631 A1 Nov. 4, 2021

(51) Int. Cl.
G01S 19/47 (2010.01)
G01S 19/23 (2010.01)
G01S 19/25 (2010.01)

(52) U.S. Cl.
CPC ........... *G01S 19/47* (2013.01); *G01S 19/23* (2013.01); *G01S 19/256* (2013.01)

(58) Field of Classification Search
CPC ........ G01S 19/47; G01S 19/23; G01S 19/256; G01S 19/49; G01C 21/165; G01C 21/28
USPC ........................................... 701/472
See application file for complete search history.

(56) References Cited

U.S. PATENT DOCUMENTS

| 8,996,311 B1* | 3/2015 | Morin ........... G01S 5/16 701/472 |
| 10,066,944 B1 | 9/2018 | McNamara et al. |
| 2005/0150289 A1 | 7/2005 | Osborne |
| 2008/0262729 A1 | 10/2008 | Bacon et al. |
| 2014/0277956 A1 | 9/2014 | Morin |
| 2015/0268047 A1* | 9/2015 | Morin ........... G01S 19/252 701/480 |

(Continued)

FOREIGN PATENT DOCUMENTS

| CN | 105698788 A | 6/2016 |
| CN | 106053879 A | 10/2016 |

(Continued)

*Primary Examiner* — Don N Vo
(74) *Attorney, Agent, or Firm* — Womble Bond Dickinson (US) LLP

(57) ABSTRACT

In one embodiment, a system includes a global navigation satellite system (GNSS) receiver unit, a first inertial measurement unit (IMU) and a second IMU. The system may further include a first micro-controller unit (MCU) coupled to the first IMU and the GNSS receiver unit to receive data from the first IMU and the GNSS receiver unit and a second MCU coupled to the second IMU and the GNSS receiver unit to receive data from the second IMU and the GNSS receiver unit.

20 Claims, 9 Drawing Sheets

(56) References Cited

U.S. PATENT DOCUMENTS

2021/0041239 A1* 2/2021 Chen .................... G01C 21/183

FOREIGN PATENT DOCUMENTS

| CN | 106441287 A | 2/2017 |
| CN | 107110975 A | 8/2017 |

* cited by examiner

DUAL INERTIAL MEASUREMENT UNITS FOR INERTIAL NAVIGATION SYSTEM

CROSS-REFERENCE TO RELATED APPLICATION

This patent application is a U.S. National Phase Application under 35 U.S.C. § 371 of International Application No. PCT/CN2020/088368, filed 30 Apr. 2020, entitled "DUAL INERTIAL MEASUREMENT UNITS FOR INERTIAL NAVIGATION SYSTEM," which is incorporated by reference herein in its entirety.

TECHNICAL FIELD

Embodiments of the present disclosure relate generally to operating autonomous driving vehicles. More particularly, embodiments of the disclosure relate to dual inertial measurement units in inertial navigation systems of autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers. Onboard processing systems can provide an approximate location of the vehicle using sensor data such as global navigation satellite system data, inertial measurement data, etc.

SUMMARY

Embodiments of the present disclosure present a method for operating an autonomous driving vehicle (ADV), an inertial navigation system and an autonomous driving system.

According to a first aspect, some embodiments of the present disclosure present a method for operating an autonomous driving vehicle (ADV), the method includes: receiving, by a first micro-controller unit (MCU), global navigation satellite system (GNSS) data from a GNSS receiver and first inertial measurement unit (IMU) data from a first IMU, the first IMU operating as a primary IMU; synchronizing, by the first MCU, the first IMU data with the GNSS data; receiving, by a second MCU, the GNSS data from the GNSS receiver and second IMU data from a second IMU, the second IMU operating as a redundant IMU; synchronizing, by the second MCU, the second IMU data with the GNSS data; and performing, by a localization module, a localization process to determine a location of the ADV based on the synchronized first IMU data and the GNSS data, or based on the synchronized second IMU data and the GNSS data in response to determining that the first IMU fails to operate properly.

According to a second aspect, some embodiments of the present disclosure preset an inertial navigation system, the inertial navigation system includes: a global navigation satellite system (GNSS) receiver; a first inertial measurement unit (IMU) operating as a primary IMU; a second IMU operating as a redundant IMU; a first micro-controller unit (MCU) to receive GNSS data from the GNSS receiver and first IMU data from the first IMU and to synchronize the first IMU data with the GNSS data; and a second MCU to receive the GNSS data from the GNSS receiver and second IMU data from the second IMU and to synchronize the second IMU data with the GNSS data; and a host interface to transmit the GNSS data, the synchronized first IMU data and the synchronized second IMU data to a localization module, wherein the localization module is configured to perform a localization process to determine a location of an autonomous driving vehicle (ADV) based on the synchronized first IMU data and the GNSS data, or based on the synchronized second IMU data and the GNSS data in response to determining that the first IMU fails to operate properly.

According to a third aspect, some embodiments of the present disclosure present an autonomous driving system, the autonomous driving system includes: an inertial navigation system, including a global navigation satellite system (GNSS) receiver, a first inertial measurement unit (IMU) operating as a primary IMU, a second IMU operating as a redundant IMU, a first micro-controller unit (MCU) to receive GNSS data from the GNSS receiver and first IMU data from the first IMU and to synchronize the first IMU data with the GNSS data, and a second MCU to receive the GNSS data from the GNSS receiver and second IMU data from the second IMU and to synchronize the second IMU data with the GNSS data; and a perception and planning system coupled to the inertial navigation system, the perception and planning system including a localization module to receive the GNSS data, the synchronized first IMU data and the synchronized second IMU data from the first MCU and the second MCU, wherein the localization module is configured to perform a localization process to determine a location of an autonomous driving vehicle (ADV) based on the synchronized first IMU data and the GNSS data, or based on the synchronized second IMU data and the GNSS data in response to determining that the first IMU fails to operate properly, a perception module to perceive a driving environment surrounding the ADV, and a planning module to plan a trajectory to autonomous drive the ADV to navigate the driving environment.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
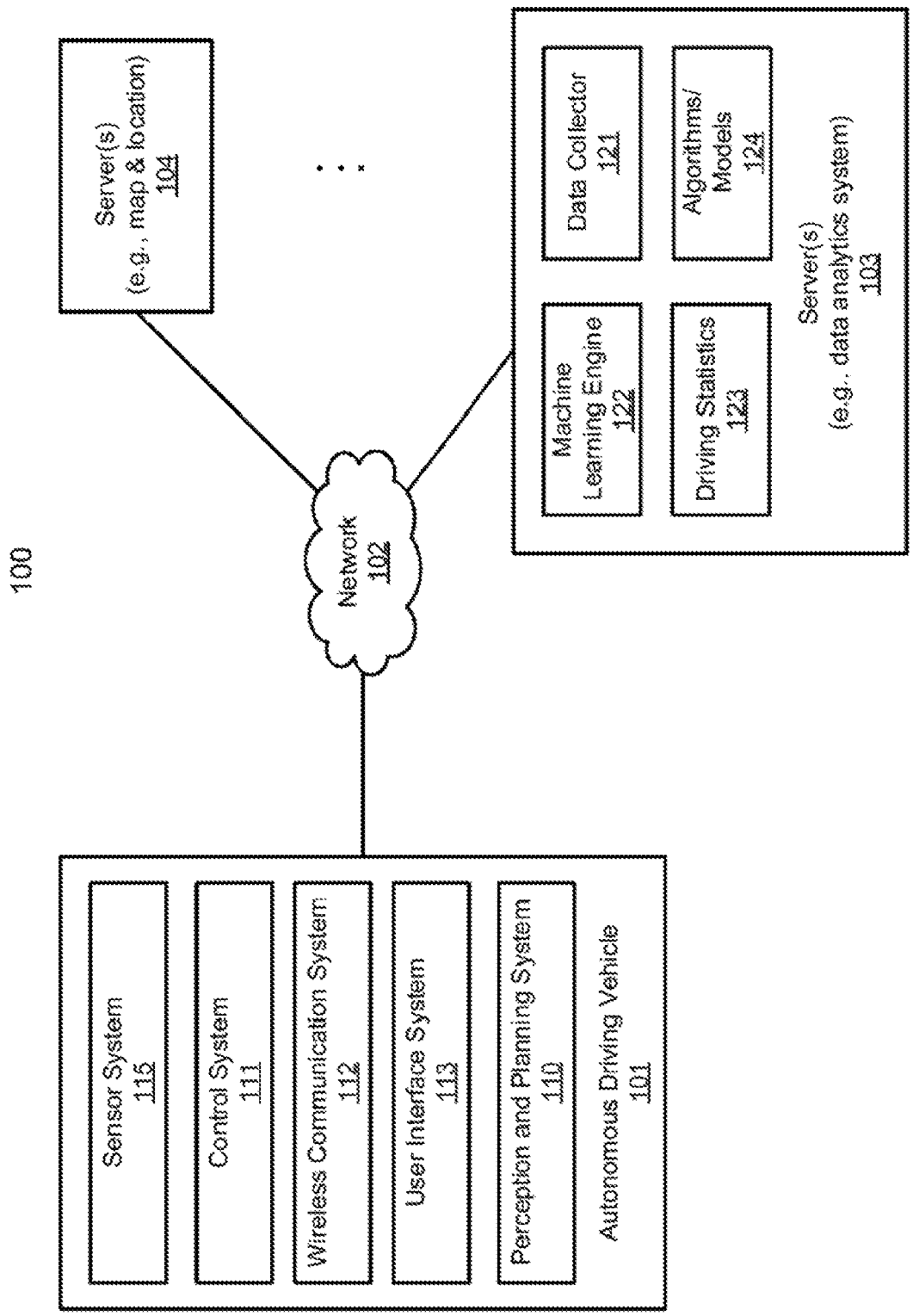
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

To calculate a location of an autonomous driving vehicle, a sensor unit can include a processing device, a global navigation satellite system (GNSS) and an inertial measurement unit (IMU). A GNSS receiver of the INS may receive position, velocity and heading of the vehicle from a satellite system. An IMU may measure acceleration and gyroscopic orientation of the vehicle. The IMU data may be received at the processing device at a much higher frequency than the GNSS data (e.g., at milliseconds). The processing device can combine the GNSS data and IMU data to estimate (e.g., using a Kalman filter) a location of the vehicle.

The processing device of the INS may sync the IMU data with current time data from the GNSS data. The processing device may then forward the synced IMU data to a localization module where the IMU data is used to sync additional sensor data. For example, the IMU data may be used to sync LiDAR data, camera data, and other sensor data. However, if the IMU or the processing device encounters issues and is unable to forward the IMU data to the localization module then the additional sensor data cannot be synced and localization processes cannot be performed.

To address the issues described above, embodiments of the present disclosure provide for dual IMUs for an INS. A second processing device, or micro-controller unit (MCU), may also be added to the INS along with the additional IMU. By adding the second MCU and IMU, if one of the MCUs or IMUs fail then the second MCU or IMU may be used to process and forward the IMU data to the localization module. Thus, the second IMU and MCU ensures that IMU data will be available to sync additional sensor data and to perform localization even if one of the MCUs or IMUs fails, or encounters an error. Furthermore, if GNSS data is unavailable to sync the IMU data, a single time obtained and forwarded by the GNSS receiver of the INS is used to sync the IMU data. Thus, the present disclosure provides for redundancy as well as time sync accuracy.

According to one aspect, an inertial navigation system includes a global navigation satellite system (GNSS) receiver, a first inertial measurement unit (IMU) operating as a primary IMU, a second IMU operating as a redundant IMU, a first micro-controller unit (MCU) to receive GNSS data from the GNSS receiver and first IMU data from the first IMU and to synchronize the first IMU data with the GNSS data, a second MCU to receive the GNSS data from the GNSS receiver and second IMU data from the second IMU and to synchronize the second IMU data with the GNSS data, and a host interface to transmit the GNSS data, the synchronized first IMU data and the synchronized second IMU data to a localization module, wherein the localization module is configured to perform a localization process to determine a location of an autonomous driving vehicle (ADV) based on the synchronized first IMU data and the GNSS data, or based on the synchronized second IMU data and the GNSS data in response to determining that the first IMU fails to operate properly.

In one embodiment, when synchronizing the first IMU data with the GNSS data, the first MCU is configured to derive first GNSS timing data from the GNSS data and timestamp the first IMU data using the first GNSS timing data. Similarly, when synchronizing the second IMU data with the GNSS data, the second MCU is configured to derive second GNSS timing data from the GNSS data and timestamp the second IMU data using the second GNSS timing data. The first IMU and the second IMU synchronize timing of the first IMU data and the second IMU data independently using the same GNSS data obtained from the GNSS receiver.

In one embodiment, the first IMU is powered by a first power supply circuit and the second IMU is powered by a second power supply circuit that is different than the first power supply circuit. The first IMU and the second IMU are mounted close to each other near a center of a rear axle of the ADV. In response to determining that the GNSS data is unavailable, the first MCU is configured to obtain first timing information from an alternative time source, wherein the first timing information is utilized to timestamp the first IMU data. The second MCU is configured to obtain second timing information from the alternative time source, wherein the second timing information is utilized to timestamp the second IMU data. The alternative time source comprises one of a local clock or a network time source.

According to another aspect, an autonomous driving system includes an inertial navigation system as described above and a perception and planning system. The perception and planning system includes at least a localization module, a perception module, and a planning module. The localization module is configured to perform a localization process to determine a location of an ADV using at least in part of the GNSS data, synchronized first and second IMU data. The perception module is configured to perceive a driving environment surrounding the ADV at the location. The planning module is configured to plan a trajectory to drive the ADV navigating through the driving environment.

FIG. 1 is a block diagram illustrating an autonomous driving vehicle network configuration according to one embodiment of the disclosure. Referring to FIG. 1, network configuration 100 includes ADV 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, perception and planning system 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
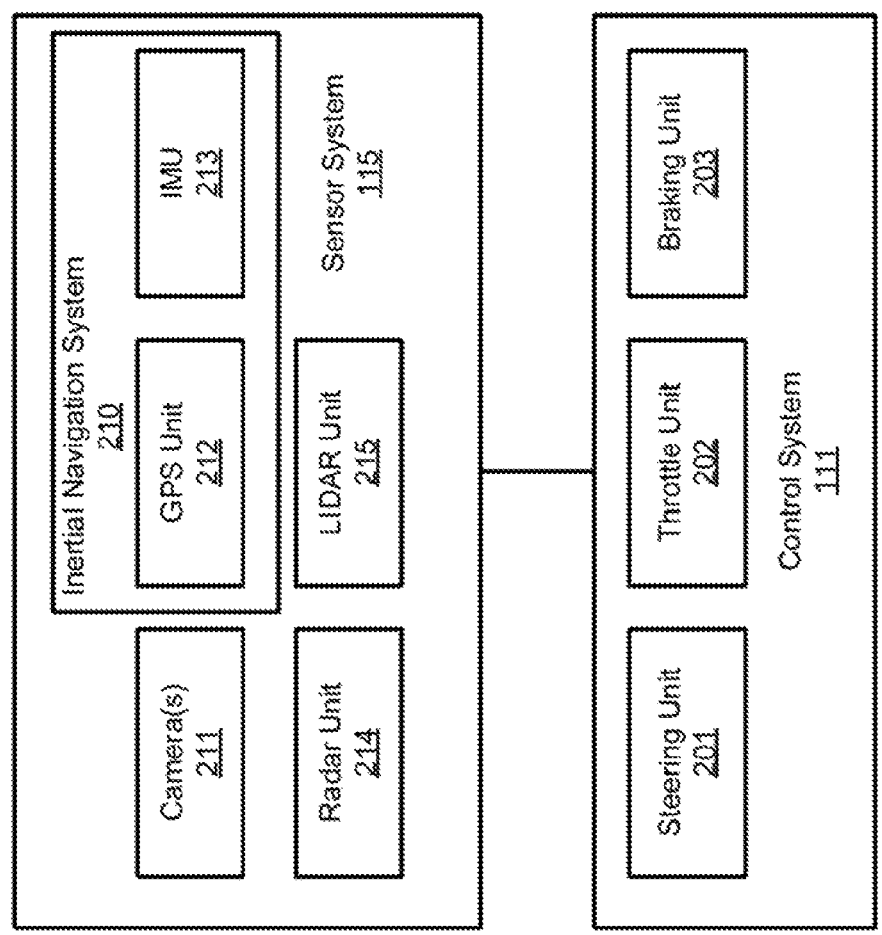
FIG. 2 is a block diagram illustrating an example of an autonomous driving vehicle according to one embodiment.

Referring now to FIG. 2, in one embodiment, sensor system 115 includes, but is not limited to, one or more cameras 211, global positioning system (GPS) unit 212, inertial measurement unit (IMU) 213, radar unit 214, and a light detection and range (LIDAR) unit 215. GPS unit 212 and IMU 213 may be included together in an inertial navigation system (INS) 210. The INS 210 may combine data from the GPS unit 212 and the IMU 213 to calculate a precise location of the ADV. GPS unit 212 may include a transceiver operable to provide information regarding the position of the ADV. IMU unit 213 may sense position and orientation changes of the ADV based on inertial acceleration and orientation. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While ADV 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, algorithms 124 may include an algorithm to synchronize various sensor data such as GNSS and IMU data using a dual IMU configuration. Algorithms 124 can then be uploaded on ADVs to be utilized during autonomous driving in real-time.

Figure 3:
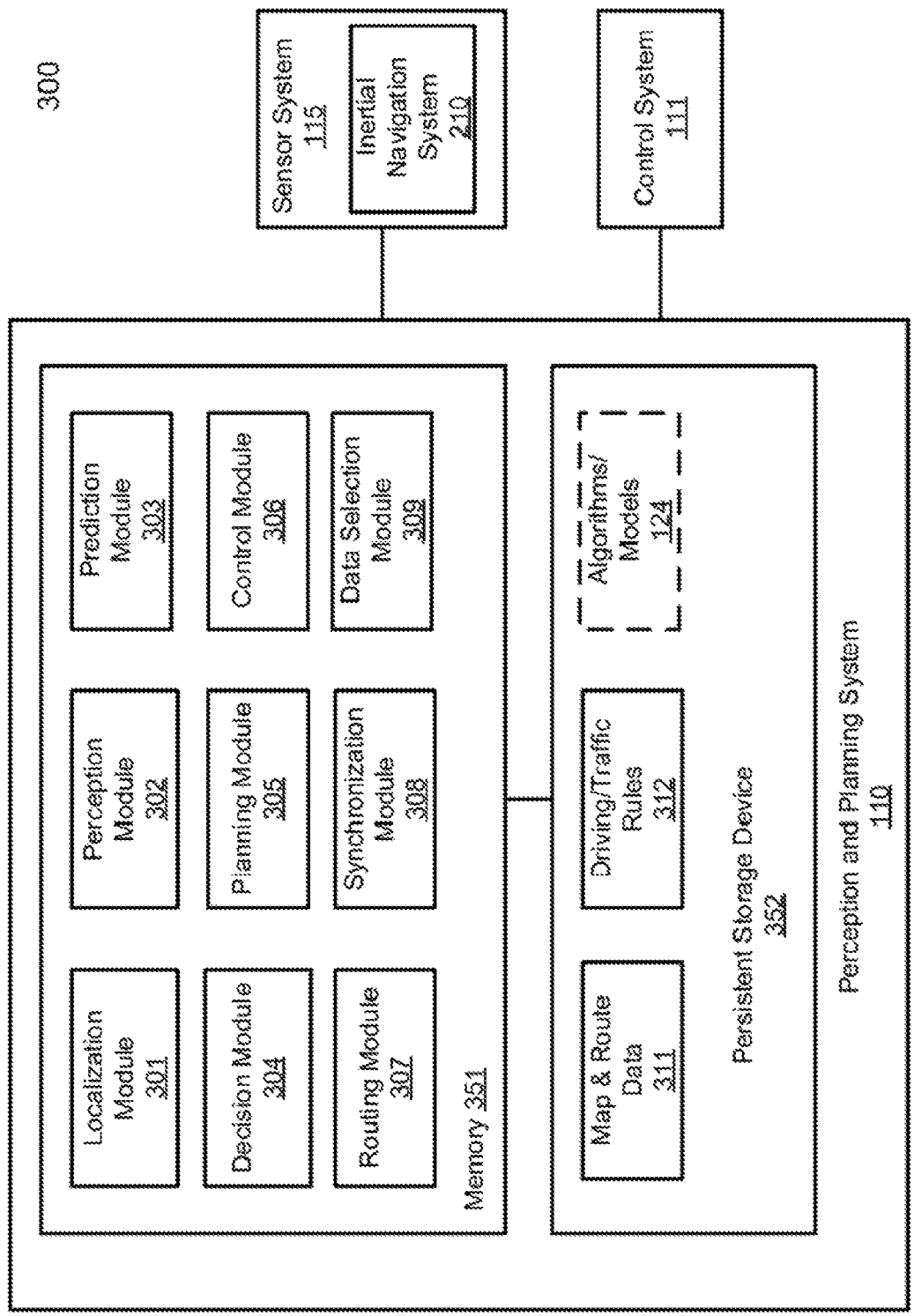
FIG. 3 is a block diagram illustrating an example of a perception and planning system used with an autonomous driving vehicle according to one embodiment.

FIG. 3 is a block diagram illustrating an example of a perception and planning system used with an ADV according to one embodiment. System 300 (also referred to as an autonomous driving system) may be implemented as a part of ADV 101 of FIG. 1 including, but not limited to, perception and planning system 110, control system 111, and sensor system 115. Referring to FIG. 3, perception and planning system 110 includes, but is not limited to, localization module 301, perception module 302, prediction module 303, decision module 304, planning module 305, control module 306, routing module 307, synchronization module 308, and data selection module 309.

Some or all of modules 301-309 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-309 may be integrated together as an integrated module.

Localization module 301 determines a current location of system 300 (e.g., leveraging INS 210) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of system 300, such as map and route data 311, to obtain the trip related data. For example, localization module 301 may obtain location and route information from a location server and a map and POI (MPOI) server. A location server provides location services and an MPOI server provides map services and the POIs of certain locations, which may be cached as part of map and route data 311. While system 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensor data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout data 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map data 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how the vehicle would move in a next moving cycle (e.g., next route/path segment). For example, the planning and control data may instruct the vehicle to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system, an inertial navigation system, and one or more maps so as to determine the driving path for the ADV.

Figure 4:
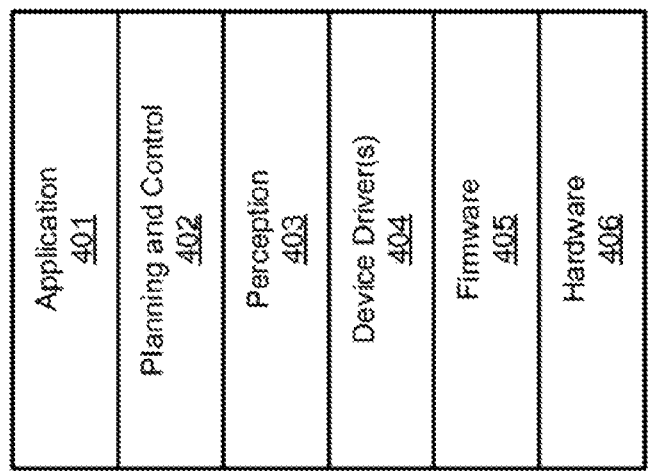
FIG. 4 is a block diagram illustrating an example system architecture for autonomous driving according to one embodiment.

FIG. 4 is a block diagram illustrating system architecture for autonomous driving according to one embodiment. System architecture 400 may represent system architecture of an autonomous driving system as shown in FIG. 3. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an ADV, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the ADV such as control system 111. Layers 401-403 can communicate with firmware layer 405 and hardware layer 406 via device driver layer 404.

Figure 5A:
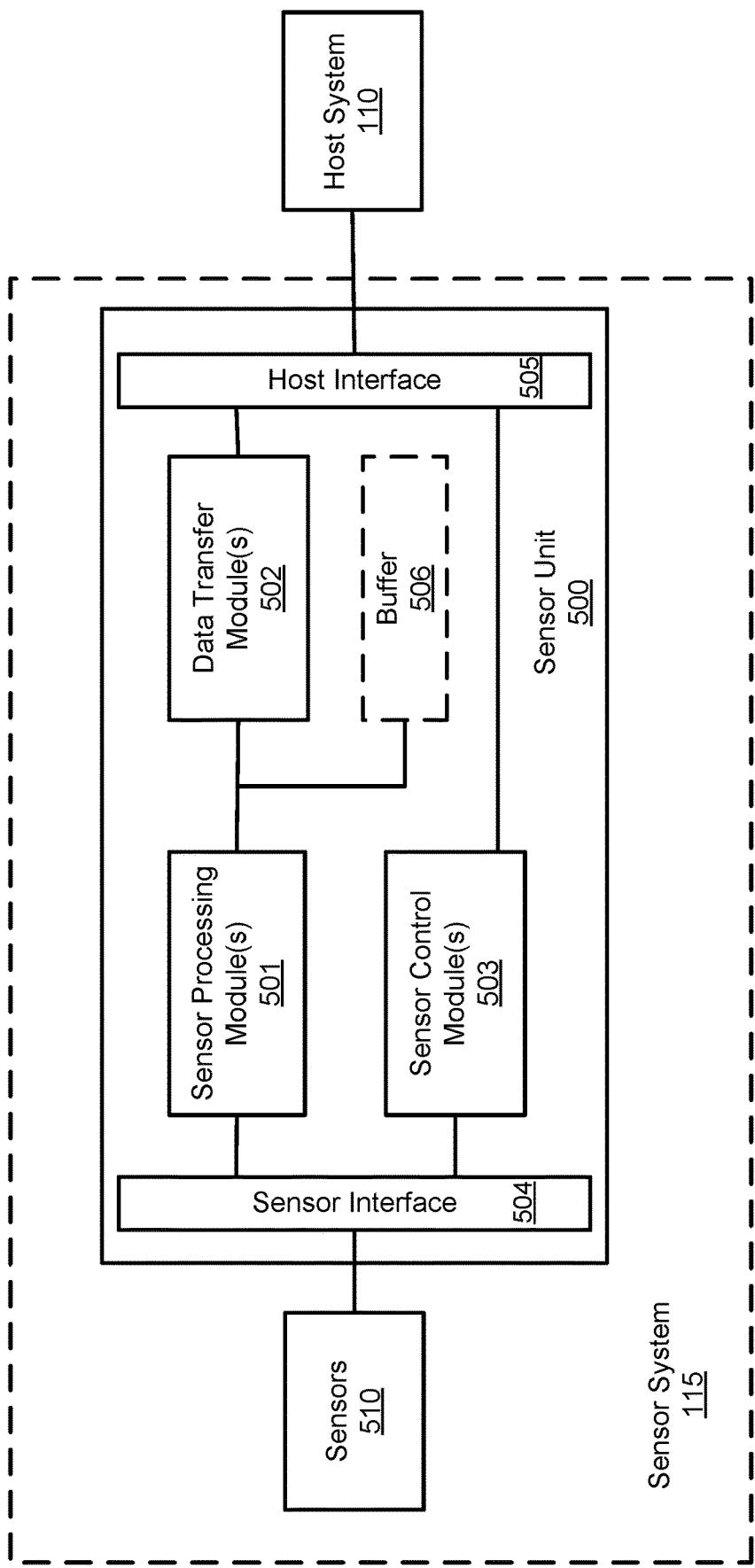
FIG. 5A is a block diagram illustrating an example of a sensor system of an autonomous driving vehicle according to one embodiment.

FIG. 5A is a block diagram illustrating an example of a sensor system according to one embodiment of the invention. Referring to FIG. 5, sensor system 115 includes a number of sensors 510 and a sensor unit 500 coupled to host system 110. Host system 110 represents a planning and control system as described above, which may include at least some of the modules as shown in FIG. 3. Sensor unit 500 may be implemented in a form of an FPGA device or an ASIC (application specific integrated circuit) device. In one embodiment, sensor unit 500 includes, amongst others, one or more sensor data processing modules 501 (also simply referred to as sensor processing modules), data transfer modules 502, and sensor control modules or logic 503. Modules 501-503 can communicate with sensors 510 via a sensor interface 504 and communicate with host system 110 via host interface 505. Optionally, an internal or external buffer 506 may be utilized for buffering the data for processing.

Figure 5B:
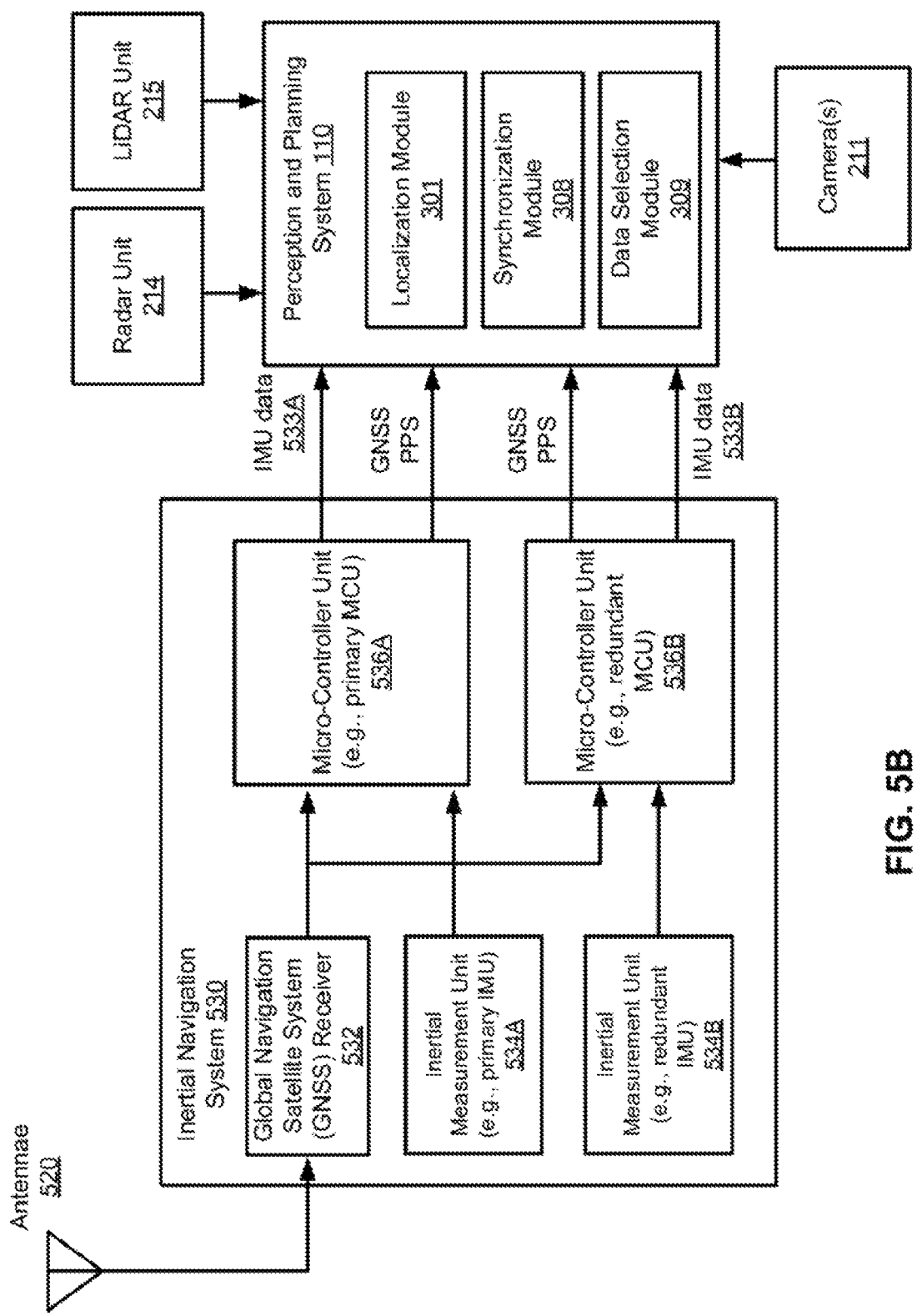
FIG. 5B is a block diagram illustrating an example inertial navigation system of an autonomous driving vehicle according to one embodiment.

In one embodiment, sensors 510 may include a GPS receiver/unit and an IMU. The GPS unit and IMU may be coupled together with a sensor unit 500 on a single FPGA, or ASIC, referred to as an inertial measurement unit (INS), as depicted in FIG. 5B. In one embodiment, sensors 510 include a first IMU as a primary IMU and a second IMU as a redundant or backup IMU, which may be independently powered by separate power supply circuits (such as voltage regulators). The sensor processing module 501 may include logic to receive data from the GPS unit and the IMU and combine the data (e.g., using a Kalman filter) to estimate a location of the automated vehicle. The sensor processing module 501 may further include, as described below with respect to FIG. 5, logic to compensate for GPS data bias due to propagation latencies of the GPS data.

In one embodiment, for the receiving path or upstream direction, sensor processing module 501 is configured to receive sensor data from a sensor via sensor interface 504 and process the sensor data (e.g., format conversion, error checking), which may be temporarily stored in buffer 506. Data transfer module 502 is configured to transfer the processed data to host system 110 using a communication protocol compatible with host interface 505. Similarly, for the transmitting path or downstream direction, data transfer module 502 is configured to receive data or commands from host system 110. The data is then processed by sensor processing module 501 to a format that is compatible with the corresponding sensor. The processed data is then transmitted to the sensor.

In one embodiment, sensor control module or logic 503 is configured to control certain operations of sensors 510, such as, for example, timing of activation of capturing sensor data, in response to commands received from host system (e.g., perception module 302) via host interface 505. Host system 110 can configure sensors 510 to capture sensor data in a collaborative and/or synchronized manner, such that the sensor data can be utilized to perceive a driving environment surrounding the vehicle at any point in time.

Sensor interface 504 can include one or more of Ethernet, USB (universal serial bus), LTE (long term evolution) or cellular, WiFi, GPS, camera, CAN, serial (e.g., universal asynchronous receiver transmitter or UART), SIM (subscriber identification module) card, and other general purpose input/output (GPIO) interfaces. Host interface 505 may be any high speed or high bandwidth interface such as PCIe (peripheral component interconnect or PCI express) interface. Sensors 510 can include a variety of sensors that are utilized in an ADV, such as, for example, a camera, a LIDAR device, a RADAR device, a GPS receiver, an IMU, an ultrasonic sensor, a GNSS (global navigation satellite system) receiver, an LTE or cellular SIM card, vehicle sensors (e.g., throttle, brake, steering sensors), and system sensors (e.g., temperature, humidity, pressure sensors), etc.

For example, a camera can be coupled via an Ethernet or a GPIO interface. A GPS sensor can be coupled via a USB or a specific GPS interface. Vehicle sensors can be coupled via a CAN interface. A RADAR sensor or an ultrasonic sensor can be coupled via a GPIO interface. A LIDAR device can be coupled via an Ethernet interface. An external SIM module can be coupled via an LTE interface. Similarly, an internal SIM module can be inserted onto a SIM socket of sensor unit 500. The serial interface such as UART can be coupled with a console system for debug purposes.

Note that sensors 510 can be any kind of sensors and provided by various vendors or suppliers. Sensor processing module 501 is configured to handle different types of sensors and their respective data formats and communication protocols. According to one embodiment, each of sensors 510 is associated with a specific channel for processing sensor data and transferring the processed sensor data between host system 110 and the corresponding sensor. Each channel may include a specific sensor processing module and a specific data transfer module that have been configured or programmed to handle the corresponding sensor data and protocol.

When operating in a low latency mode, according to one embodiment, a data transfer module (e.g., data transfer module 502) is configured to send the sensor data received from a sensor to the host system as soon as possible without or with minimum delay. Some of sensor data are very sensitive in terms of timing that need to be processed as soon as possible. Examples of such sensor data include vehicle status such as vehicle speed, acceleration, steering angle, etc.

When operating in a high bandwidth mode, according to one embodiment, a data transfer module (e.g., data transfer module 502) is configured to accumulate the sensor data received from a sensor up to a predetermined amount, but is still within the bandwidth the connection between the data transfer module and the host system 110. The accumulated sensor data is then transferred to the host system 110 in a batch that maximum the bandwidth of the connection between the data transfer module and host system 110. Typically, the high bandwidth mode is utilized for a sensor that produces a large amount of sensor data. Examples of such sensor data include camera pixel data.

When operating in a memory mode, according to one embodiment, a data transfer module is configured to write the sensor data received from a sensor directly to a memory location of a mapped memory of host system 110, similar to a shared memory page. Examples of the sensor data to be transferred using memory mode include system status data such as temperature, fans speed, etc.

FIG. 5B depicts an inertial navigation system (INS) 530 which may be implemented as a part of sensor system 115 of FIG. 5A. The INS 530 includes, but is not limited to, a GNSS receiver 532 (otherwise referred to as GPS unit), two inertial measurement units (IMUs) 534A (e.g., primary IMU) and 534B (e.g., redundant/backup IMU), and two micro-controller units (MCUs) 536A (e.g., primary MCU) and 536B (e.g., redundant/backup MCU). GNSS receiver 532 may receive and process GNSS measurements (GNSS data) from antennae 520, which may be external to the INS 530 (e.g., on the roof of the vehicle). GNSS receiver 532 may then forward GNSS measurements to each of the MCUs 536A and 536B. GNSS data may include a position, velocity, and heading of the vehicle, along with timestamp indicating when the measurement was taken. GNSS receiver 532 may also obtain time information from an internal real time clock, a network time protocol, or other local means, if GNSS data is unavailable.

In one embodiment, IMUs 534A and 534B may measure acceleration and orientation of the automated vehicle. IMU 534A may send the IMU measurements to MCU 536A to be combined and/or synced with the GNSS measurement data. For example, syncing the IMU measurements with the GNSS data may include timestamping the IMU measurement with the timestamp of the GNSS data. IMU 534B may send the IMU measurements to MCU 536B to be combined and/or synced with the same GNSS measurement data. In one embodiment, the GNSS data may be unavailable, such as when the GNSS signal is poor. In such a situation, GNSS time data is unavailable to sync the IMU data. Therefore, time data may be obtained and forwarded from an internal clock (e.g., real time clock) or network time protocol of the GNSS receiver 532 to the MCUs 536A-B to timestamp the IMU data. Therefore, the IMU data from each of the IMUs 534A-B is synced with the same time data even if the GNSS data is unavailable.

Once the IMU measurements from each of the IMUs 534A-B are synced with the GNSS data at their respective corresponding MCUs 536A-B, the synced IMU data and the GNSS data along with a pulse-per-second signal may be forwarded from the MCUs 536A-B to a perception and planning system 110 of a host computing system. In another embodiment, if the GNSS data in unavailable, the IMU data and the internal clock data or network time data is forwarded from the MCUs 536A-B to the perception and planning system 110. The perception and planning system 110 may include a localization module 301, a synchronization module 308 and a data selection module 309, as depicted in FIG.

3. The data selection module 309 may determine which IMU data (i.e., IMU data 533A from IMU 534A and MCU 536A or IMU data 533B from IMU 534B and MCU 536B) to be used in further operations.

For example, the data selection module may initially use IMU data 533A by default unless the data selection module 309 detects an error in IMU data 533A indicating that IMU data 533A is unreliable. If the data selection module 309 detects an error in IMU data 533A, then the data selection module 309 may select IMU data 533B to be used in further perception and planning operations. In another example, the most accurate IMU data (e.g., as measure against the GNSS data) may be selected for use in further operations. In one embodiment, determining that the IMU data 533A is faulty may be based on any number of comparisons and/or tests of the data. For example, the data selection module 309 may determine that the data is faulty by comparing IMU data 533A with the other IMU data 533B, comparing the IMU data with the GNSS data, determining whether data is missing from the IMU data 533A, determining whether there is jitter or noise in the data, or if less data was received than was expected.

Once one of the IMU data 533A-B is selected by the data selection module 309, the synchronization module 308 may synchronize additional sensor data (e.g., data received from radar unit 214, LiDAR unit 215, cameras 211, and any other sensors) with the selected IMU data and the GNSS data such as PPS (pulses per second). In one embodiment, the synchronization may include timestamping each of the sensor data measured at approximately the same time with the timestamp of the selected IMU data. The timestamp may further be calibrated each second based on the GNSS pulse-per-second also received by the perception and planning system 110 from the MCUs 536A-B. Finally, once all sensor data is synchronized, the localization module 301 may perform a localization of the ADV to determine a location, orientation, heading, and surroundings of the ADV. The localization data may then be used to plan a path of the ADV.

Figure 6:
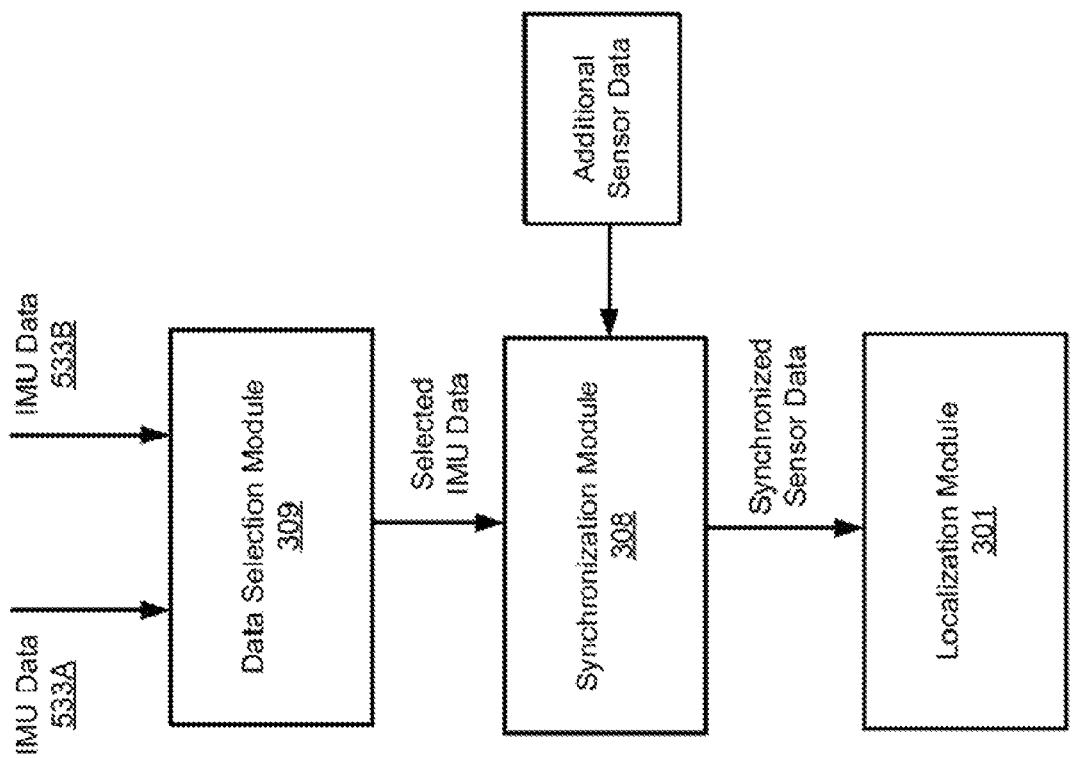
FIG. 6 is a flow diagram illustrating an example system and method for using dual inertial measurement units within an inertial navigation system according to one embodiment.

FIG. 6 is a block diagram illustrating the process flow of selecting and using IMU data from one of multiple IMUs. The process flow of FIG. 6 may occur within a perception and planning module 110 of a host computer. In one embodiment, a data selection module 309 receives IMU data from two different IMUs of an INS (i.e., IMU data 533A-B). The data selection module 309 may determine which IMU data (i.e., IMU data 533A from IMU 534A and MCU 536A or IMU data 533B from IMU 534B and MCU 536B) to be used in further operations.

For example, the data selection module may initially use IMU data 533A by default unless the data selection module 309 detects an error in IMU data 533A indicating that IMU data 533A is unreliable. If the data selection module 309 detects an error in IMU data 533A, then the data selection module 309 may select IMU data 533B to be used in further perception and planning operations. In another example, the most accurate IMU data (e.g., as measure against the GNSS data) may be selected for use in further operations. In one embodiment, determining that the IMU data 533A is faulty may be based on any number of comparisons and/or tests of the data. For example, the data selection module 309 may determine that the data is faulty by comparing IMU data 533A with the other IMU data 533B, comparing the IMU data with the GNSS data, determining whether data is missing from the IMU data 533A, determining whether there is jitter or noise in the data, or if less data was received than was expected.

Next, the selected IMU data may be forwarded to a synchronization module 308. The selected IMU data may have previously been timestamped (i.e., synchronized) using GNSS data. The selected IMU data may then be used by the synchronization module to further synchronize the additional sensor data (e.g., the additional sensor data may be timestamped with the same timestamp as the selected IMU data). Finally, the synchronized sensor data, including the selected IMU data, may be forwarded to the localization module 301. The localization module 301, as described with respect to FIG. 3, may perform a localization of the ADV to determine a location, orientation, heading, and surroundings of the ADV all based on the sensor data, the selected IMU data, and any other data obtained by the localization module 301 (e.g., map data). The localization data generated by the localization module 301 may then be used to plan a path of the ADV.

Figure 7:
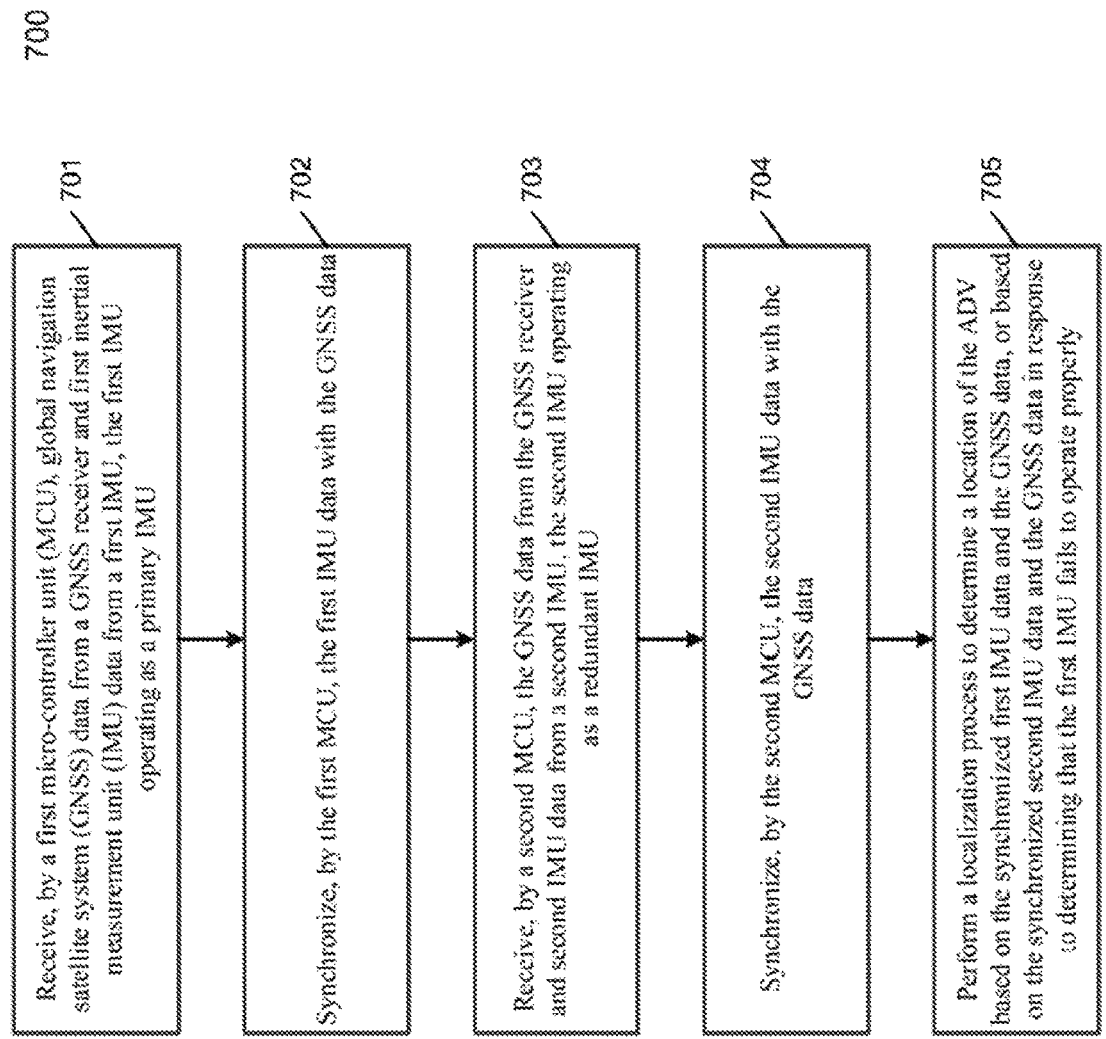
FIG. 7 is a flow diagram illustrating an example method for using dual inertial measurement units within an inertial navigation system according to another embodiment

FIG. 7 is a flow diagram illustrating a process of operating an autonomous driving vehicle according to one embodiment. Process 700 may be performed by processing logic which may include software, hardware, or a combination thereof. For example, process 700 may be performed by an autonomous driving system as described above. Referring to FIG. 7, at block 701, a first MCU receives GNSS data from a GNSS receiver and first IMU data from a first IMU, where the first IMU operates as a primary IMU. At block 702, the first MCU synchronizes, for example, synchronizing in time, the first IMU data with the GNSS data. At block 703, a second MCU receives the same GNSS data from the GNSS receiver and second IMU data from a second IMU, where the second IMU operates a redundant or backup IMU. At block 704, the second MCU synchronizes, for example, synchronizing in time, the second IMU data with the GNSS data. At block 705, processing logic performs a localization process to determine a location of an ADV based on the synchronized first IMU data and the GNSS data or alternatively, based on the synchronized second IMU data and the GNSS data in response to determining that the first IMU fails to operate properly.

The IMU data from the second IMU may be synced with GNSS data (or time data from an internal clock or network time protocol of a GNSS receiver if GNSS data is unavailable) at the second processing device and forwarded to the localization module. The GNSS data may be the same GNSS data synced with the IMU data from the first IMU at the first processing device. The processing logic may determine whether there is an error associated with the first data. In one example, if there is no error then the first data may be used for the synchronization operation. If the processing logic detects an error associated with the first data, then the processing logic may determine to use the second data rather than the first data to perform the synchronization operation. The error may indicate that the first IMU or the first processing device has failed or is encountering issues that result in incorrect data being provided to the localization module.

In one embodiment, the processing logic may determine that there is an error in the first data using one or more of several methods. One method for detecting the error may include comparing the first data with the second data. In one example, if the first data differs from the second data by a threshold amount then the processing logic may determine that at least the first or second data is in error. The processing logic may then continue to a second method for determining whether it is the first or the second data that is in error. For example, the processing logic may compare the first data with GNSS location data to determine if there is discrepancy. In another example, the processing logic may determine whether data that is expected to be included is missing from the first data. In another example, the processing logic determines whether there is a large amount of noise or jitter in the first data.

Figure 8:
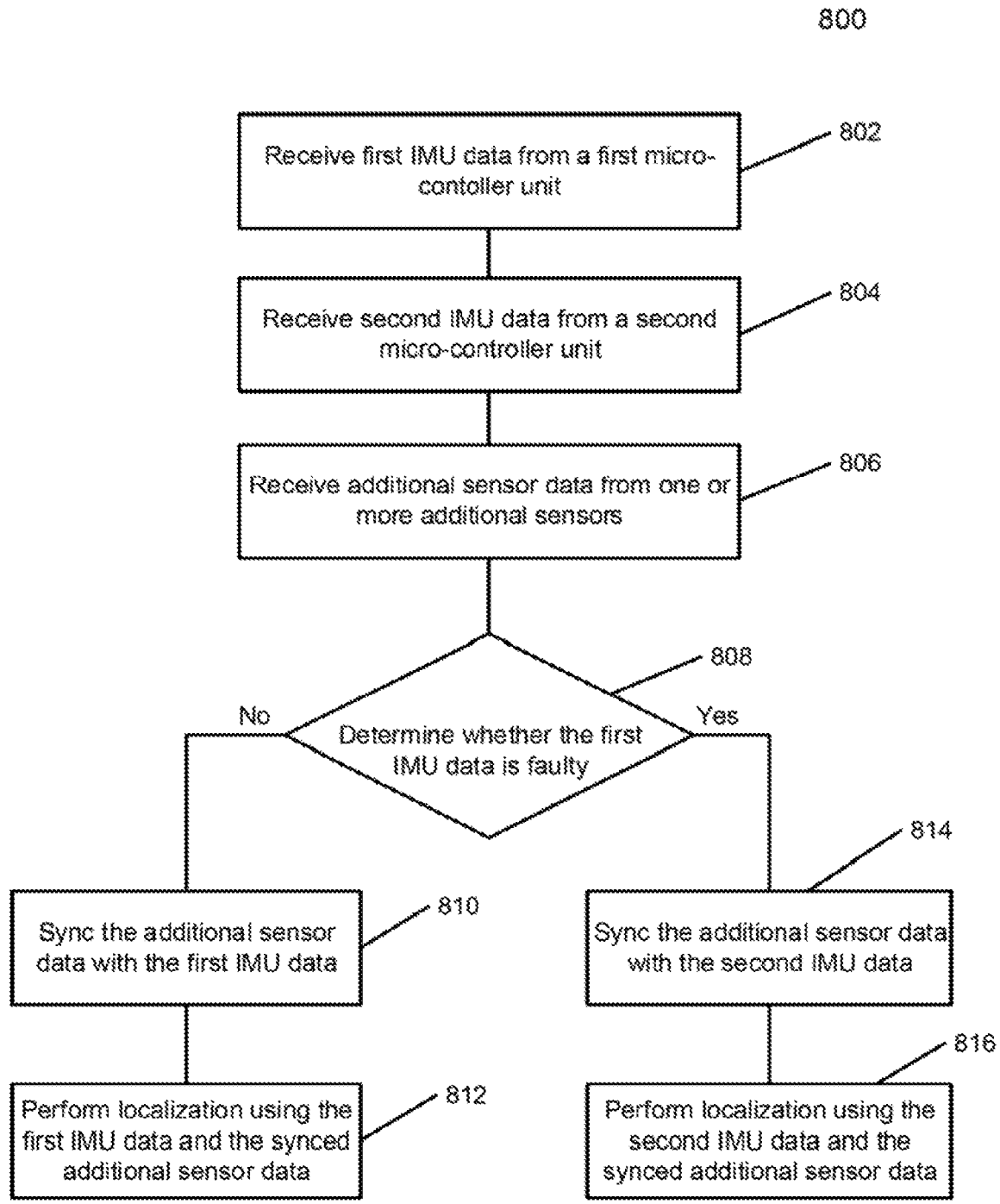
FIG. 8 is a flow diagram illustrating an example method for using dual inertial measurement units within an inertial navigation system according to another embodiment.

FIG. 8 is a flow diagram illustrating a process of adjusting for GNSS latency in an INS according to another embodiment. Process 800 may be performed by data selection module 309 and synchronization module 308 of perception and planning module 110. At operation 802, processing logic receives first IMU data from a first micro-controller unit. The first IMU data may be data measured by a first IMU of an INS. The first IMU data may also be synchronized with GNSS data at the first micro-controller unit.

At operation 804, the processing logic receives second IMU data from a second micro-controller unit. The second IMU data may be generated by a second IMU of the INS. The first and second micro-controller units and the first and second IMUs may all be included in the same INS. The first and second micro-controller units may sync the first and second IMU data with the same GNSS data (or other time data from an internal real time clock or network time protocol of a GNSS receiver if GNSS data is unavailable). For example, the first micro-controller unit may receive GNSS data (or other time data) from a GNSS receiver and the second micro-controller unit may receive the same GNSS data from the same GNSS receiver, as depicted in FIG. 5B. Thus, both the first and second IMU data may by synchronized with the same GNSS data (or other time data, such as from a real time clock or network time protocol of the GNSS receiver) at the first and second micro-controller units.

At operation 806, processing logic receives additional sensor data from one or more additional sensors. The additional sensors may be any type of sensor obtaining measurements about the state of the ADV. For example, the additional sensors may include cameras, LiDAR, radar, etc.

At operation 808, the processing logic determines whether the first IMU data is faulty. The first IMU data may be faulty if its reliability does not meet a threshold reliability. For example, the processing logic may determine that the first IMU data is faulty by comparing the first IMU data with the second IMU data, comparing the IMU data with the GNSS data (if available), determining whether data is missing from the IMU data, determining whether there is jitter or noise in the data, if less data was received than was expected, and so forth. A particular threshold may be associated with each of these methods for determining if the first IMU data is faulty. For example, if the first IMU data differs from the GNSS data by a threshold amount then the processing device may determine that the first IMU data is faulty.

At operation 810, in response to determining that the first IMU data is not faulty, the processing logic synchronizes the additional sensor data with the first IMU data. For example, the additional sensor data may be timestamped with the same timestamp as the first IMU data. At operation 812, the processing logic performs localization using the first IMU data and the synchronized additional data. Localization of the ADV may include determining a location, orientation, heading, and surroundings of the ADV all based on the sensor data, the first IMU data, and any other data obtained by the processing logic. The localization data may then be used to plan a path of the ADV.

At operation 814, in response to determine that the first IMU data is faulty, the processing logic synchronizes the additional sensor data with the second IMU data rather than the first IMU data. For example, the additional sensor data may be timestamped with the same timestamp as the second IMU data rather than the first IMU data. At operation 816, the processing logic performs localization using the second IMU data and the synchronized additional sensor data. Localization of the ADV may include determining a location, orientation, heading, and surroundings of the ADV all based on the sensor data, the second IMU data, and any other data obtained by the processing logic. The localization data may then be used to plan a path of the ADV.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method for operating an autonomous driving vehicle (ADV), the method comprising:
receiving, by a first micro-controller unit (MCU), global navigation satellite system (GNSS) data from a GNSS receiver and first inertial measurement unit (IMU) data from a first IMU, the first IMU operating as a primary IMU;
synchronizing, by the first MCU, the first IMU data with the GNSS data;
receiving, by a second MCU, the GNSS data from the GNSS receiver and second IMU data from a second IMU, the second IMU operating as a redundant IMU;
synchronizing, by the second MCU, the second IMU data with the GNSS data;
determining, by a data selection module, a selected IMU data to use from the synchronized first IMU data and the synchronized second IMU data;
synchronizing, by a synchronization module, additional sensor data using the selected IMU data; and
performing, by a localization module, a localization process to determine a location of the ADV based on the selected IMU data, the GNSS data, and the synchronized additional sensor data.

2. The method of claim 1, wherein synchronizing the first IMU data with the GNSS data comprises:
deriving first GNSS timing data from the GNSS data; and
timestamping the first IMU data using the first GNSS timing data.

3. The method of claim 1, wherein synchronizing the second IMU data with the GNSS data comprises:
deriving second GNSS timing data from the GNSS data; and
timestamping the second IMU data using the second GNSS timing data.

4. The method of claim 1, wherein the first IMU and the second IMU synchronize timing of the first IMU data and the second IMU data independently using the same GNSS data obtained from the GNSS receiver.

5. The method of claim 1, wherein the first IMU is powered by a first power supply circuit and the second IMU is powered by a second power supply circuit that is different than the first power supply circuit.

6. The method of claim 1, wherein the first IMU and the second IMU are mounted close to each other near a center of a rear axle of the ADV.

7. The method of claim 1, further comprising:
determining that the GNSS data is unavailable;
obtaining, by the first MCU, first timing information from an alternative time source, wherein the first timing information is utilized to timestamp the first IMU data; and
obtaining, by the second MCU, second timing information from the alternative time source, wherein the second timing information is utilized to timestamp the second IMU data.

8. The method of claim 7, wherein the alternative time source comprises one of a local clock or a network time source.

9. An inertial navigation system, comprising:
a global navigation satellite system (GNSS) receiver;
a first inertial measurement unit (IMU) operating as a primary IMU;
a second IMU operating as a redundant IMU;
a first micro-controller unit (MCU) to receive GNSS data from the GNSS receiver and first IMU data from the first IMU and to synchronize the first IMU data with the GNSS data; and
a second MCU to receive the GNSS data from the GNSS receiver and second IMU data from the second IMU and to synchronize the second IMU data with the GNSS data; and
a host interface to transmit the GNSS data, the synchronized first IMU data and the synchronized second IMU data to a perception and planning system comprising a data selection module, a synchronization module, and a localization module,
wherein the data selection module is configured to determine a selected IMU data to use from the synchronized first IMU data and the synchronized second IMU data,
wherein the synchronization module is configured to synchronize additional sensor data using the selected IMU data, and
wherein the localization module is configured to perform a localization process to determine a location of an autonomous driving vehicle (ADV) based on the selected IMU data, the GNSS data, and the synchronized additional data.

10. The inertial navigation system of claim 9, wherein in synchronizing the first IMU data with the GNSS data, the first MCU is configured to:
derive first GNSS timing data from the GNSS data; and
timestamp the first IMU data using the first GNSS timing data.

11. The inertial navigation system of claim 9, wherein in synchronizing the second IMU data with the GNSS data, the second MCU is configured to:
derive second GNSS timing data from the GNSS data; and
timestamp the second IMU data using the second GNSS timing data.

12. The inertial navigation system of claim 9, wherein the first IMU and the second IMU synchronize timing of the first IMU data and the second IMU data independently using the same GNSS data obtained from the GNSS receiver.

13. The inertial navigation system of claim 9, wherein the first IMU is powered by a first power supply circuit and the second IMU is powered by a second power supply circuit that is different than the first power supply circuit.

14. The inertial navigation system of claim 9, wherein the first IMU and the second IMU are mounted close to each other near a center of a rear axle of the ADV.

15. The inertial navigation system of claim 9, wherein in response to determining that the GNSS data is unavailable, the first MCU is configured to obtain first timing information from an alternative time source, wherein the first timing information is utilized to timestamp the first IMU data; and the second MCU is configured to obtain second timing information from the alternative time source, wherein the second timing information is utilized to timestamp the second IMU data.

16. The inertial navigation system of claim 15, wherein the alternative time source comprises one of a local clock or a network time source.

17. An autonomous driving system, comprising:
an inertial navigation system, including:
- a global navigation satellite system (GNSS) receiver,
- a first inertial measurement unit (IMU) operating as a primary IMU,
- a second IMU operating as a redundant IMU,
- a first micro-controller unit (MCU) to receive GNSS data from the GNSS receiver and first IMU data from the first IMU and to synchronize the first IMU data with the GNSS data, and
- a second MCU to receive the GNSS data from the GNSS receiver and second IMU data from the second IMU and to synchronize the second IMU data with the GNSS data; and a perception and planning system coupled to the inertial navigation system, the perception and planning system including:
- a data selection module to determine a selected IMU data to use from the synchronized first IMU data and the synchronized second IMU data,
- a synchronization module to synchronize additional sensor data using the selected IMU data,
- a localization module to receive the GNSS data, the synchronized first IMU data and the synchronized second IMU data from the first MCU and the second MCU, wherein the localization module is configured to perform a localization process to determine a location of an autonomous driving vehicle (ADV) based on the selected IMU data, the GNSS data, and the synchronized additional data,
- a perception module to perceive a driving environment surrounding the ADV, and
- a planning module to plan a trajectory to autonomously drive the ADV to navigate the driving environment.

18. The autonomous driving system of claim 17, wherein in synchronizing the first IMU data with the GNSS data, the first MCU is configured to:
derive first GNSS timing data from the GNSS data; and
timestamp the first IMU data using the first GNSS timing data.

19. The autonomous driving system of claim 17, wherein in synchronizing the second IMU data with the GNSS data, the second MCU is configured to:
derive second GNSS timing data from the GNSS data; and
timestamp the second IMU data using the second GNSS timing data.

20. The autonomous driving system of claim 17, wherein the first IMU and the second IMU synchronize timing of the first IMU data and the second IMU data independently using the same GNSS data obtained from the GNSS receiver.

* * * * *